June 19, 1956  J. V. DAVIS  2,750,897
LOADING AND UNLOADING APPARATUS
Filed Jan. 21, 1952  3 Sheets-Sheet 1

INVENTOR.
JOHN V. DAVIS
BY
ATTORNEY.

June 19, 1956 J. V. DAVIS 2,750,897
LOADING AND UNLOADING APPARATUS
Filed Jan. 21, 1952 3 Sheets-Sheet 2

INVENTOR.
JOHN V. DAVIS.
BY
*Samuel C. Weisman*
ATTORNEY.

June 19, 1956 J. V. DAVIS 2,750,897
LOADING AND UNLOADING APPARATUS
Filed Jan. 21, 1952 3 Sheets-Sheet 3

INVENTOR.
JOHN V. DAVIS
BY
Samuel Weisman
ATTORNEY.

United States Patent Office 2,750,897
Patented June 19, 1956

2,750,897

LOADING AND UNLOADING APPARATUS

John V. Davis, Detroit, Mich., assignor to The Udylite Corporation, Detroit, Mich., a corporation of Delaware Application January 21, 1952, Serial No. 267,376

5 Claims. (Cl. 104—96)

The present invention pertains to novel improvements in a loading and unloading apparatus of the character disclosed in my copending application, Serial No. 181,650, filed August 16, 1950, Patent No. 2,645,186 of July 14, 1953.

It is customary to load and unload the work at a station embodied in a plating or like processing machine. This station adds to the length of the machine and also adds disproportionately to the cost since the machine is built primarily for processing and costs more per foot than a mere conveyor, conveying being the only function of the loading and unloading station.

The loading and unloading operations at the station are manual in most cases, connecting up with separate conveyors for delivering the work from or to other parts of the plant. Another objection to this system is that the workers at the station are exposed to fumes from the processing machine.

The general object of this invention, as set forth in the above patent, is to overcome the stated objections and to provide a more economical system for the operations described. More particular objects are to reduce the length of the loading and unloading station in the processing machine, to transfer the work in and out of the machine mechanically, thereby eliminating the manual labor and the exposure of workers to fumes, and to enable loading and unloading of the work at remote points in the plant.

In the accomplishment of these objects, a conveyor is provided adjacent to the processing machine and preferably at a somewhat higher level. This conveyor, as well as the conveyor in the processing machine, comprises a rail with work carriers thereon and pushers for advancing the carriers. Each rail has a gap, and a common rail segment is movable mechanically from one gap to the other. Thus, when the rail segment fills the gap in the processing machine rail, a work carrier is moved thereon, and the segment is transferred to the gap in the conveyor rail, to be moved to the unloading point. In like manner, work to be processed is loaded on the conveyor and transferred by the segment to the processing machine. The two machines are interlocked in operation so that there is no movement of work in the vicinity of an unfilled gap in either rail.

The movement of the common rail segment between the conveyor and the processing machine is such that this segment turns somewhat on its longitudinal axis during this movement. The work carrier suspended from the rail segment will not hang vertically and will exert strains on the segment, unless the segment has a cylindrical surface. In many machines, however, the main rail is flat, and a similar common segment would be subject to the strains previously mentioned.

The particular object of this invention is to provide a common segment and a work carrier that hangs vertically from the segment in the shifting movement, although the main rails of the conveying machine and the processing machine are flat. In this connection it will be understood that the work carrier has a flat-sided recess to accommodate the correspondingly shaped main rail, and the same practice is observed in this invention. The particular object of this invention is accomplished by employing a cylindrical common rail segment and providing the work carrier with a correspondingly shaped recess or cavity in addition to the usual flat-sided recess. The flat-sided recess is wider than the cylindrical recess and extends beyond both of its edges. When the carrier travels on a flat main rail, its cylindrical cavity does not interfere with the operation. Similarly, when the carrier is on the cylindrical common rail segment, it is supported at the wall of the cylindrical cavity, permitting the work carrier to maintain a vertical position notwithstanding axial turning of the common rail segment.

The invention is fully disclosed by way of example in the following description and in the accompanying drawings in which.

Reference to these views will now be made by use of like characters which are employed to designate parts throughout.

Figure 1:
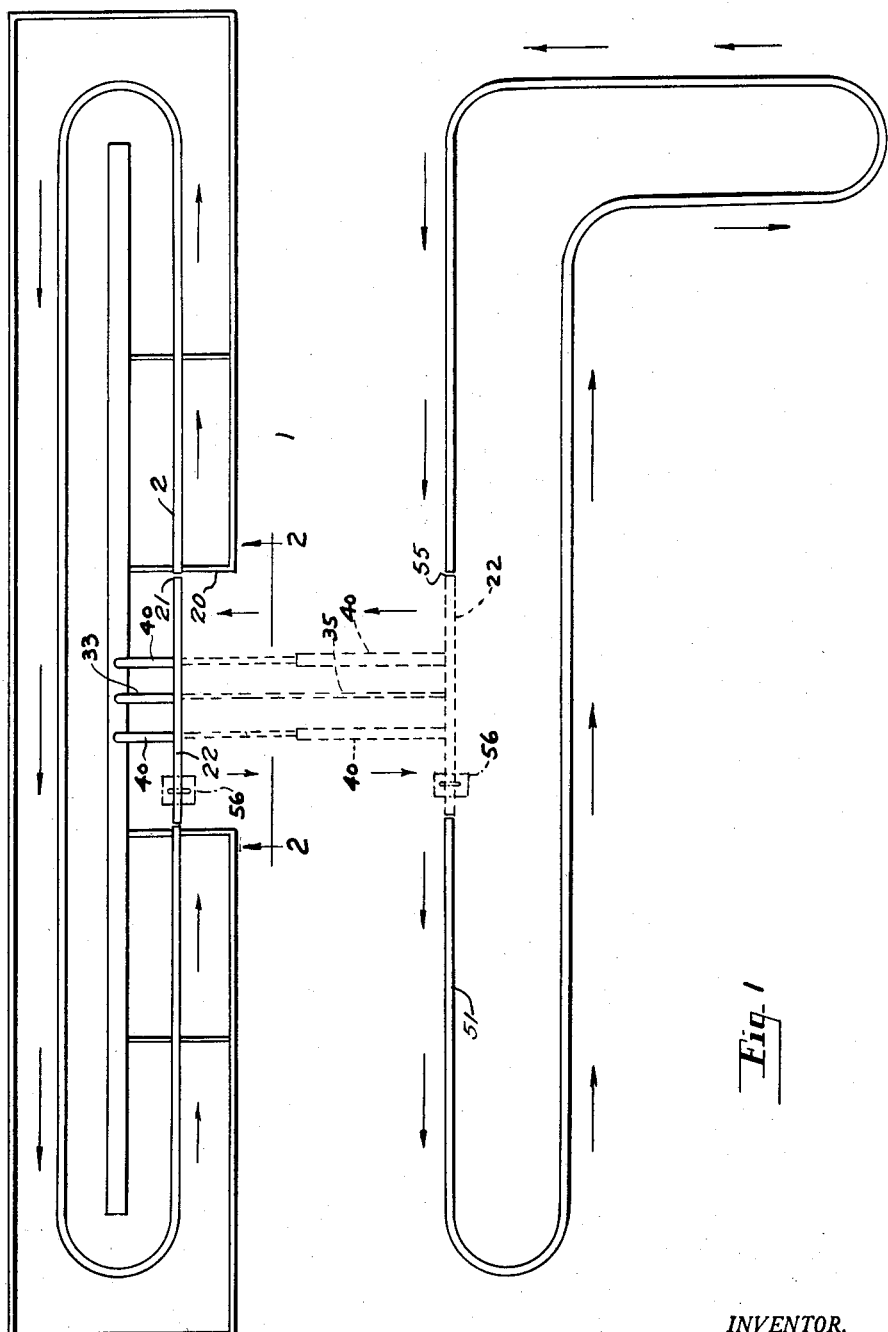
Figure 1 is a schematic plan view of an apparatus embodying the invention.

In Figure 1 is shown a series of plating tanks 1 incorporated in a plating machine as shown in Patent No. 2,479,322 or in my copending application Serial No. 755,365, filed June 18, 1947, Patent No. 2,650,600 of September 1, 1953. Although these machines have endless conveyors, the invention is also applicable to straight line or open ended machines. The tank structure 1 is divided by partitions into a number of compartments for containing various solutions or baths in which the work is successively treated, as well known in the art. A rail 2 follows the series of compartments and carries a number of slidably mounted work carriers or hooks 3 which are moved intermittently along the rail by suitable means, for example as disclosed in the aforementioned patent or application.

The propelling mechanism here illustrated is similar to that shown in Patent No. 2,645,186. A frame structure 4 embodies a longitudinal angle iron 5 to which is secured a series of spaced guides 6 having alined horizontal guide slots 7. A T-shaped bar 8, or a series of such bars, is mounted for oscillation in the slots 7. Pusher members 9 are fixed or pivotally attached to the bar or bars 8 and are positioned to abut the carriers 3. A pivotal mounting 10 is provided between a pusher 9 and its bar 8 in positions where the pusher must be retracted over a carrier into pushing position behind it. A suitable mechanism is provided for oscillating the bar or bars 8.

The series of tanks 1 is interrupted by an open space or gap 20 which has approximately the length of three work carrier intervals. The rail 2 is also interrupted at this space, leaving a gap 21 which is filled at times by a displaceable rail segment 22 supported and moved by mechanism that will presently be described.

A longitudinal structural member 30 is laid in the bottom of the space 20 at the rearward portion thereof. On this member is mounted as longitudinal shaft or rod 32. On the shaft is pivotally mounted the lower end of a hydraulic cylinder 33. Through the upper end of the cylinder extends a piston rod 35. An angle iron 36 extending lengthwise of the space 20 is secured to the upper end of the piston rod 35 by a pair of nuts 37.

At each side of the cylinder 33 is a telescopic tube 40 attached at its lower end to the shaft 32 at the corresponding end bearing 31. The outer telescopic section has its upper end welded to a face plate 41 fastened along the angle iron 36 by bolts 42 passed through vertical slots 43 in the plate 41 for vertical adjustment of the latter. A suitable number of laterally extending brackets 45 are secured to the plate 41 and angle iron 36. On the brackets are mounted pillow blocks 46 which carry the previously mentioned rail segment 22. Rollers 47 are mounted at the ends of the segment 22 for a purpose that will presently be described.

Adjacent to the tank structure 1 is a conveyor which includes a rail 51 similar to the tank rail 2. The rail 51 may be endless if desired and extends to suitable locations for loading and unloading as well as through stations for various treatments of the work, such as drying, painting, polishing and the like. The work is propelled intermittently along the rail by suitable means as shown in Patent No. 2,479,322.

The conveyor rail 51 has a portion parallel and directly adjacent to that part of the rail 2 which has the gap 21. This portion has a gap 55 directly opposite the gap 21 and of the same length. The rail segment 22 is movable from the gap 21 to the gap 55 and vice versa.

The processing machine is loaded and unloaded from the conveyor rail 51 through the movement of the segment 22 carrying one or more work carriers 3. Work racks 56 are suspended from the latter in the usual manner. The rail segment 22 is displaced by a properly timed operation of the hydraulic cylinder 33, 35.

For the initial guiding of the segment 22 toward the conveyor, the sliding tube sections 40 carry rollers 60 received in inclined rails 61 which are secured to posts 62 mounted on the structural member 30. Another pair of rails 63 extends from the ends of the gap 21 to the ends of the gap 55 and receives the previously mentioned rollers 47. To maintain the terminal positions of the segment 22, the lower ends of the rails 61 are formed with stops 64 engaged by the rollers 60 through gravity, and the upper ends of the rails 63 are formed with stops 65 engaged by the rollers 47 through the pressure in the hydraulic cylinder.

In the diagram shown in Figure 1, the work on both rails is moved in the same direction. Consequently the parts of the work at the gaps move oppositely to one another, one part moving to the right and the other to the left, as indicated by the arrows. A peculiar result is obtained by reason of these opposite motions. Let it be assumed that the conveyor moves from right to left in Figure 1, bringing the work onto the right-hand end of the segment 22 while in the gap 55. Before the work carrier reaches the point at which the hydraulic cylinder is attached to the segment 22, the segment is shifted to the gap 21 of the processing machine rail. At the gap 21 the work in the processing machine moves from left to right, as already indicated, so that the work carrier rides off the same or right-hand end of the segment 22. Similarly, when the work comes around to the left-hand end of the segment 22 while in the processing machine, the segment is shifted to the conveyor and moved off the same or left-hand end of the segment.

Thus, the intermediate portion of the segment 22, where it is supported by the hydraulic cylinder, is not traversed by the work carriers, and there is no interference between the suspended work and the hydraulic cylinder. Otherwise, if the point of support were traversed by the work carriers, a complicated construction would be necessary to provide a clearance between the moving work and the supporting hydraulic cylinder. For the disclosed mode of operation, the ends of the segment 22 overhang or extend beyond the telescopic members 40 sufficiently to receive the work on and discharge it from these overhanging ends.

Figure 2:
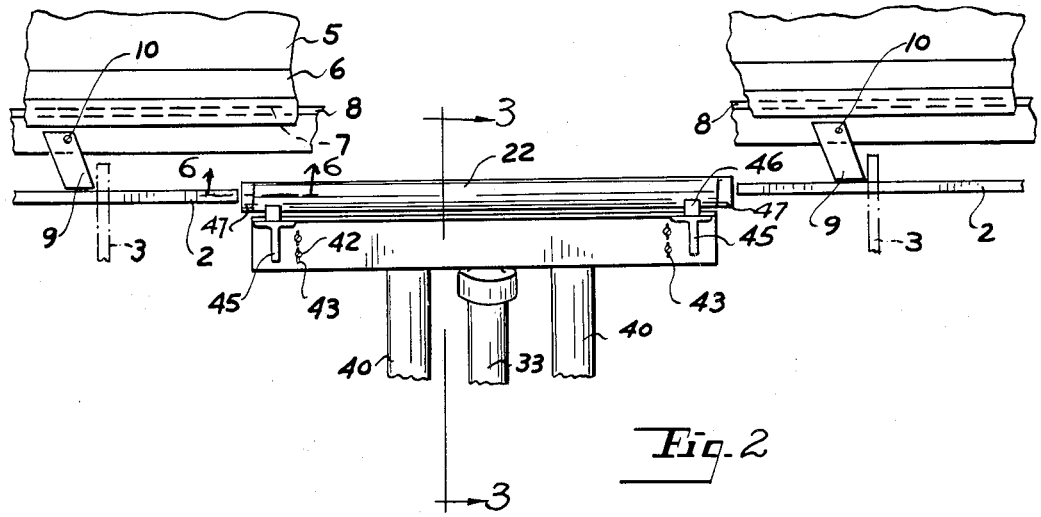
Figure 2 is a section on the line 2—2 of Figure 1.
Figure 3:
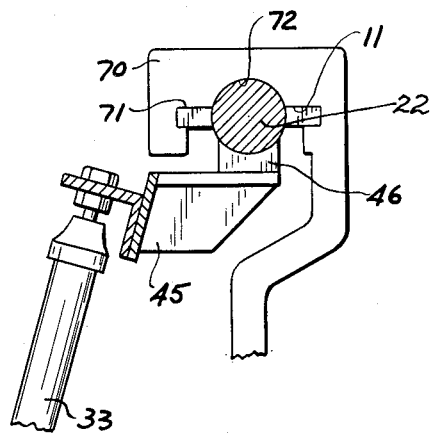
Figure 3 is a section on the line 3—3 of Figure 2.
Figure 5:
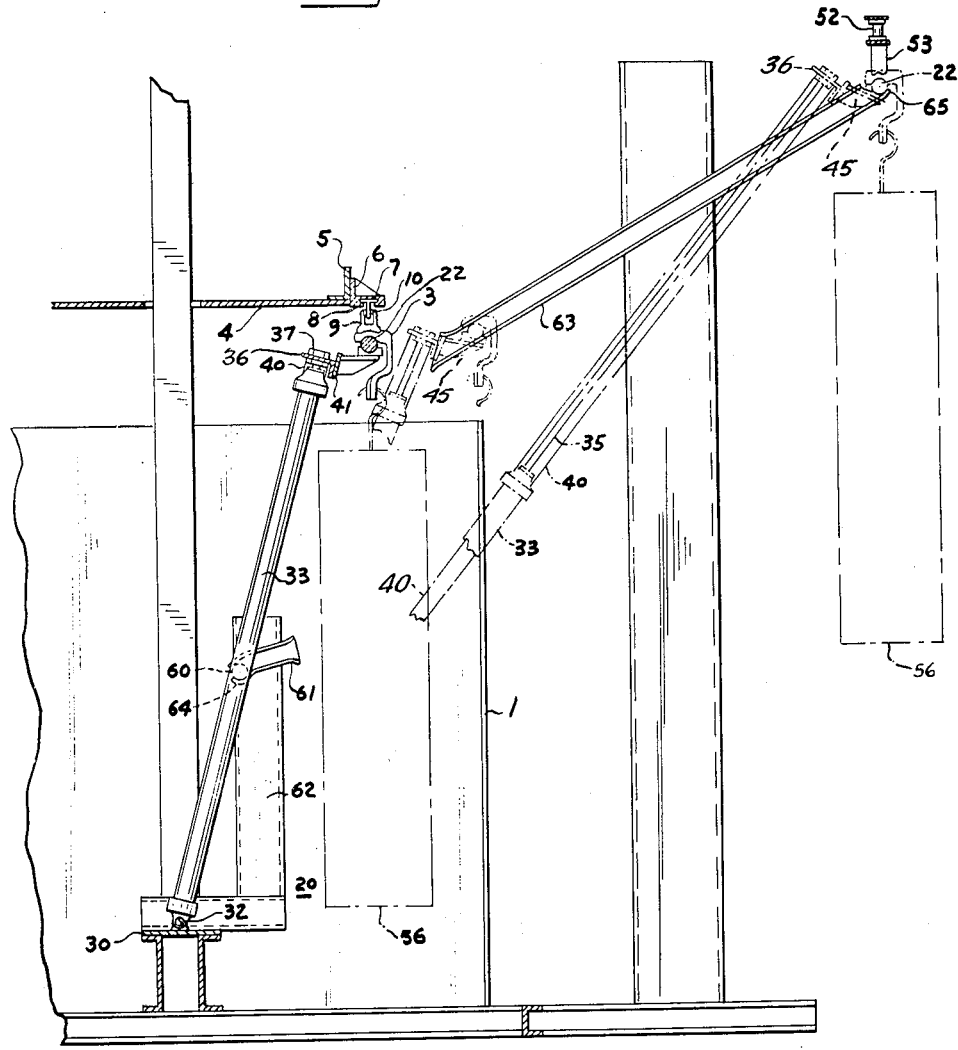
Figure 5 is a cross section showing the entire height of the apparatus, on the plane of the line 3—3.

It may be seen in Figures 2 and 3 that the main rails 2 and 51 are of narrow rectangular section and lie horizontally in this case. The head 70 of the work carrier 3 is formed with a correspondingly shaped parallel-wall cavity 71 as known in the art. If the shifting segment 22 were similarly shaped it would turn on its axis, out of the horizontal plane, during the shifting movement, as indicated by the dotted line positions of its supporting brackets 45 in Figure 5. This turning movement of the segment would likewise turn the carrier 3 away from a freely suspended vertical position, as a result of which the load on the carrier would set up distorting stresses in the segment 22.

To overcome this difficulty, the segment 22 is in the form of a cylindrical segment having a diameter less than the width and greater than the height of the cavity 71, as shown in Figure 3. The head 70 of the carrier 3, moreover, is formed with an arcuate cavity 72 extending upward from the upper wall of the cavity 71 to receive the segment 22. The cavity 72 has the same space relation to the cavity 71 as the segment 22 has to the rail 2, in order that the segment 22 will be received in the cavity 72 as the carrier is moved from one of the main rails to the segment 22.

The carrier 3 is thus free to swing relatively on the segment 22 while the latter is turned on its axis during shifting as described. The carrier and its load maintain a freely suspended position with respect to the segment 22, with the result that no strains and stresses are set up in the segment. The rectangular cavity 72 has no function while the carrier is suspended from the segment 22 and thus does not interfere with the described relative swinging of the carrier.

Figure 4:
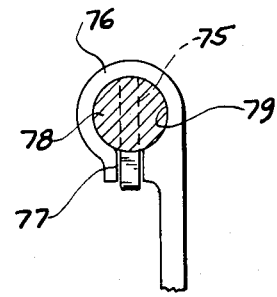
Figure 4 is a similar section on a modification.
Figure 6:
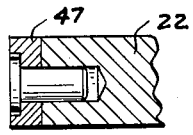
Figure 6 is a section on the line 6—6 of Figure 2.

In the modification shown in Figure 4 the main rail sections 75 are vertical, and the head 76 of the carrier is formed with a vertical slot 77 to receive the rail. The common rail segment 78 is cylindrical and lies below and substantially tangent to the upper edge of the rail 75. Above the slot 77, the head 76 is formed with a nearly complete cylindrical cavity 79 adapted to receive the segment 78 in the manner previously described. It will be evident that the operation is similar to that previously set forth.

Although specific embodiments of the invention have been illustrated and described, it will be understood that various alterations in the details of construction may be made without departing from the scope of the invention as indicated by the appended claims.

What I claim is:

1. In a loading and unloading apparatus, a processing machine including a horizontal flat rail, a conveyor including a similar flat rail spaced horizontally and vertically from the first rail, said rails having respectively parallel portions with a gap in each such portion, said gaps being directly opposite each other and of equal length, a cylindrical rail segment adapted to fit selectively in said gaps, a support for said segment, means for shifting said support from either gap to the other, a portion of the surface of said segment lying above the surface of either rail when the segment is alined in a gap, a work carrier adapted to ride in suspended position on said rails and segment, said carrier having a recess dimensioned and positioned to receive said rails and having a protruding arcuate cavity dimensioned and positioned to receive said segment, and means for moving said segment from one gap to the other.

2. In a loading and unloading apparatus, a processing machine including a horizontal flat rail, a conveyor including a similar flat rail spaced horizontally and vertically from the first rail, said rails having respectively parallel portions with a gap in each such portion, said gaps being directly opposite each other and of equal length, a cylindrical rail segment adapted to fit selectively in said gaps, a support for said segment, means for shifting said support from either gap to the other, a portion of the surface of said segment lying above the surface of either rail when the segment is alined in a gap, a work carrier adapted to ride in suspended position on said rails and segment, said carrier having a recess dimensioned and positioned to receive said rails and having a protruding arcuate cavity dimensioned and positioned to receive said segment, a support fixed on said segment, and means for moving said support in an axially turning condition from one gap to the other.

3. In combination with a horizontal flat rail, a cylindrical rail segment adapted to be alined therewith, a work carrier adapted to ride in suspended position on said rail and segment, said carrier having a recess dimensioned and positioned to receive said rail and having a protruding arcuate cavity dimensioned and positioned to receive said segment.

4. A work carrier having a head for suspension from a rail, said head having a horizontal parallel-wall recess for receiving a flat rail and having an arcuate cavity protruding upwardly from the top of the recess, for receiving a cylindrical rail section.

5. A work carrier having a head for suspension from a rail, said head having a horizontal parallel-wall recess for receiving a flat rail and having an arcuate cavity protruding upwardly from the top of the recess, for receiving a cylindrical rail section, said recess having a greater extent in the transverse horizontal direction than vertically, and said cavity lying above the recess and between its longitudinal edges.

References Cited in the file of this patent

UNITED STATES PATENTS

| | | |
|---|---|---|
| 500,358 | Turner | June 27, 1893 |
| 961,433 | Fitzgerald | June 14, 1910 |
| 1,522,332 | Schmitz | Jan. 6, 1925 |
| 1,596,166 | Everett | Aug. 17, 1926 |
| 1,622,574 | Deady | Mar. 29, 1927 |
| 1,748,309 | Rose | Feb. 25, 1930 |
| 2,035,355 | Weise | Mar. 24, 1936 |
| 2,349,717 | Graham | May 23, 1944 |
| 2,361,290 | Herold | Oct. 24, 1944 |
| 2,488,523 | Bilger | Nov. 22, 1949 |
| 2,525,327 | Weber | Oct. 10, 1950 |
| 2,645,186 | Davis | July 14, 1953 |